Patented May 19, 1942

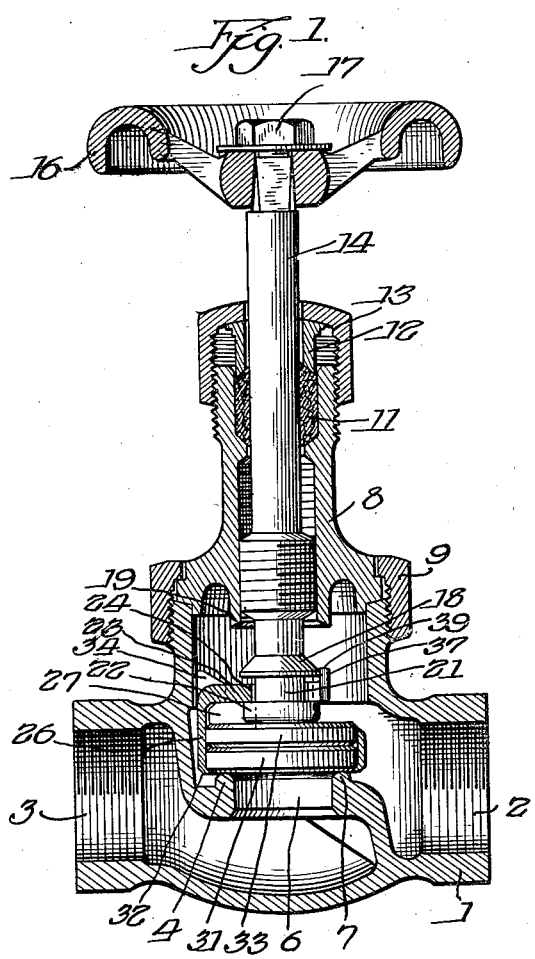

2,283,772

UNITED STATES PATENT OFFICE 2,283,772

RETAINING DISK HOLDER

Carl R. Stone, Chicago, Ill., assignor to Crane Co., Chicago, Ill., a corporation of Illinois Application August 25, 1941, Serial No. 408,180

11 Claims. (Cl. 251—44)

This invention relates to valves and more particularly to a new and improved retaining disk or closure member holding means. It has for one of its principal objects the provision of a device capable of securely holding a composition disk or the like in addition to providing means for the easy removal of the disk to facilitate ready renewal of the same when required.

An important object of this invention is to provide holding means for a valve disk in which the latter member is preferably without the usual central apertures therethrough.

Another important object of this invention is the provision of a novel form of composition valve disk or the like which because of its form insures against leakage therepast and is capable of being closed tight with less applied effort, thereby permitting the use of smaller handwheels, associated valve trimmings and operating parts.

A still further important object of this invention is to provide a valve construction capable of being opened with less lift than prior conventional valves and one that will be more economical relative to manufacture and assembly costs.

Other and further important objects will become apparent from the disclosures in the following specification and accompanying drawing, in which Fig. 1 is a vertical sectional assembly view of a valve employing the retaining disk holder of this invention.

Fig. 2 is a perspective view of the disk holder of this invention.

Fig. 3 shows a top plan view of the disk holder shown in Fig. 2.

Fig. 4 is a front view of the disk holder of Fig. 2.

Fig. 5 is a modified form of the construction shown in Fig. 1.

As shown in the drawing: The reference numeral 1 of Fig. 1 indicates generally the body or casing of a valve having ports 2 and 3 and an apertured partition or bridge wall 4 therebetween. The aperture 6 in the said partition 4 may have a raised ring 7 thereacround for use as a seat. A closure member assembly, as hereinafter described in greater detail, is provided for cooperative engagement with the seat 7 to interrupt or to permit the flow of fluid from the inlet to the outlet. The valve is provided with the conventional bonnet 8, the union bonnet ring 9 for holding the latter member in position, the packing 11, the gland 12, the packing nut 13, the stem 14, and the handwheel 16 with the customary wheel nut 17. The stem 14 is provided with an annular beveled flange 18 for sealing with the depending shank 19 of the bonnet 8 when the valve is in the fully opened position. Immediately below the beveled annular flange 18 of the stem 14 is an annular groove 21 which has a subjacent annular flange or stem head 22. The disk holder generally shown in Figs. 2 and 3 is adapted to be slipped onto and around the annular groove 21 of the stem 14 as shown by means of the upper plate 23 and the circular socket 24.

The disk holder is assembled with the stem 14 in the manner described before it is inserted into the valve body 1. Inasmuch as the disk holder merely slides over the stem head 22 it is of necessity held in position and guided vertically by the upper bored portion of the body of the valve as indicated. Having particular reference to its novel features, the disk holder has an apertured skirt 26 depending from the upper plate portion 23. As shown more clearly in the perspective view, the top plate 23 and its depending skirt 26 have the respective annularly positioned openings 27, 28 and 29 to aid in the removal of the composition or the like disk 31 which in its normal position is placed within and surrounded entirely by the depending sleeve 26. The lower edge of the sleeve 26 is turned or tapered inwardly as shown at 32 to hold the disk 31 securely and positively in proper position thus enclosing the latter completely on its periphery.

The positioning of the disk 31 within the disk holder is obtained by sliding it through the opening 29 adjacent to and just below the top plate portion 23. When it is centrally located within the disk holder it will drop to its normal lowermost position as shown in Fig. 1. It is desirable but not absolutely necessary to have a retaining washer 33 assembled in the same manner as the disk and adapted to back up the disk on its uppermost surface. This washer 33 is preferably of metal or suitable relatively rigid, durable material and of sufficient strength to compensate for the possible lack of strength in the composition disk 31. The disk holder with its composition disk 31 and its retaining washer 33 is now ready for assembly with the valve stem 14. The disk holder is positioned on the stem by engagement of the socket 24 with the annular groove 21. The lower annular flange 22 of the stem now contacts and slides over the upper surface of the retaining washer 33 thus positively holding the washer 33 and the disk 31 in stationary position relative to the disk holder.

In some cases it may be satisfactory to dispense with the use of the back-up washer 33, and as shown in the modification in Fig. 5, the disk holder is made of shorter overall height to house only the disk 31 and thus avoids the use of the retaining washer 33 shown in Fig. 1. In this construction, the composition disk 31 is held firmly in place by the undersurface of the stem head 22 acting directly against the top surface of the composition disk to hold the latter in place, and in the same manner as previously described in connection with the construction described in Fig. 1.

It is evident therefore that this new and improved disk holder of my invention possesses advantages over the previous conventional disk holders of this type. Enumerating the advantages, they are: (1) easy disk removal; (2) elimination of leakage around the back of the disk; (3) closing with less effort; (4) requires less lift to clear the seat opening; (5) improves flow characteristics because of the absence of a disk nut within the seat aperture; (6) more secure method of attachment; (7) lower manufacturing and assembly costs.

The conventional valve of this type has a cup-shaped holder for the composition disk. These valves are used on hot water, gas, air and steam lines and frequently trouble has been experienced with the composition disk sticking under a mild vulcanizing action or else because of being crushed within its cup-shaped holder. Removal of this vulcanized composition disk from the cup-shaped holder is quite difficult and hence renewal of the disk is inconvenient. In my device there is no such difficulty experienced in removing the composition disk from the disk holder. The procedure in removing the disk 31 from its holder is first to rotate the stem thereby lifting the holder and the disk into the bonnet as in the fully open position of the valve. As best shown in Fig. 2, there are three guide ribs, namely 34, 36 and 37 which peripherally guide the entire closure member vertically within the body 1 of the valve. When the valve is fully opened and the closure member retracted its full distance, the upper ends 38 and 39 of the guide ribs 36 and 37, respectively, are adapted to fit over the depending shank 19 of the bonnet and thereby prevent the disk holder from falling from the valve stem 14 when its associated parts are removed from the valve body 1. After such disassembly from the valve body 1, the stem is turned downwardly to disengage the projecting portions 38 and 39 at the upper end of the guide ribs 36 and 37 from the depending shank 19 of the bonnet 8. The entire disk holder with its disk 31 and retaining washer 33 is then slid off the stem. Upon such operation, by the removal of the T head 22 at the bottom of the stem, the retaining washer and composition disk may be moved upwardly into the space left vacant by the stem head. It is then a simple matter to force the disk and retaining washer upwardly into the space previously occupied by the lower end 22 of the stem 14, and to force the retaining washer 33 out through the opening 29 and following it with the composition disk. Should the disk vulcanize or otherwise adhere to the retaining washer the openings 27 and 28 provide sufficient space for forcing in a sharp tool to separate the two members.

Numerous details of construction may be varied throughout a wide range without departing from the principles disclosed by this application, and I, therefore, do not propose limiting the patent granted hereon otherwise than as necessitated by the prior art.

I claim:

1. A valve comprising a body, a stem, a closure member removably engaging the said stem, the said closure member including a disk holder and a disk, the said disk holder having an upper apertured plate portion and a depending sleeve having apertures therearound, one of the latter apertures serving as the means for inserting the said disk within the said disk holder, an inwardly-extending portion formed at the lower edge of said depending sleeve, said disk being normally restrained against substantial axial movement by its fitted interposition between said stem and said inwardly extending portion at the lower edge.

2. A valve comprising a body, a stem, a closure member removably engaging the said stem, the said closure member comprising a disk holder and a disk, the said disk holder having an upper apertured plate portion and a depending sleeve having apertures therearound, the said stem having a head portion normally engaging the said apertured plate portion of the said disk holder whereby such latter engagement serves to hold the said disk in the lowermost portion of the said disk holder, the aperture with which the said stem is engaged in the said upper apertured plate portion extending to the periphery thereof and communicating with an aperture in said depending sleeve whereby said disk holder may readily be removed from engagement with said stem by a single movement transverse thereto.

3. A valve comprising a body, a stem, a closure member removably engaging the said stem comprising a disk holder and a disk, the said disk holder comprising an upper apertured plate portion and a depending sleeve having apertures therearound, one of said latter apertures being of sufficient size to permit passage of said disk therethrough in assembling or disassembling said closure member, the said stem having axially spaced-apart means at the lower end thereof whereby engagement is effected between the said disk holder and the said stem, the said disk holder having means at its lower portion for supporting the said disk, whereby between the said stem and the said disk holder the said disk is held against substantial axial movement with relation to the disk holder.

4. A valve comprising a body, a stem, a closure member removably engaging the said stem comprising a disk holder and a disk, the said disk holder comprising an upper apertured plate, a depending sleeve having apertures therearound, one of said latter apertures being of sufficient size to permit passage of said disk therethrough in assembling or disassembling said closure member, the said stem having spaced-apart annular flanges at the lower end thereof whereby engagement is effected between the said disk holder and the said stem, the said disk holder having the lower edge of its said depending sleeve portion sloped inwardly, retaining washer means adapted to bear against the upper surface of the said disk whereby the said latter member and the said retaining washer means are held rigidly in the said disk holder upon assembly with the said stem.

5. A valve comprising a body, a stem, a closure member removably engaging the said stem comprising a disk holder and a disk, the said disk holder comprising an upper apertured plate portion, a depending sleeve having apertures therearound, the said stem having a pair of spaced-apart annular flanges at the lower end thereof whereby engagement is effected between the said disk holder and the said stem, the said disk holder having the lower edge of the said depending sleeve shouldered inwardly, whereby the said disk is held rigidly in the said disk holder by the inwardly shouldered lower edge and the lower annular flange of the said stem, the said upper apertured plate portion of the said disk holder having an enlarged aperture extending to the periphery thereof whereby an annular flange of the said stem and the said disk are insertable in the said disk holder.

6. A valve comprising a body, a stem, a closure member removably engaging the said stem comprising a disk holder and a disk, the said disk holder comprising an upper apertured plate portion, a depending sleeve having apertures therearound, the said stem having annular flange means at the lower end thereof whereby engagement is effected between the said disk holder and the said stem, the disk holder having the lower edge of the said depending sleeve formed inwardly, the said disk being normally held rigidly in the said disk holder between the inwardly formed lower edge and the annular flange means of the said stem, the said plate portion of the said disk holder having a side aperture whereby the said stem and disk are insertable within the said disk holder.

7. A valve comprising a body, a stem, a closure member removably engaging the said stem comprising a disk holder and a disk, the said disk holder comprising an upper apertured plate, a depending sleeve having apertures therearound, the said stem having annular flange means at the lower end thereof whereby engagement is effected between the said disc holder and the said stem, the disk holder having the lower edge of the said depending sleeve shouldered inwardly for support of the said disk, a retaining washer superposed upon the said disk whereby the said disk and retaining washer are held rigidly in said disk holder by the inwardly shouldered lower edge and the annular flange means of the said stem, the apertured plate of the said disk holder having an aperture extending from the center substantially to the periphery thereof for entrance of the said annular flange means and the said disk, the said disk holder having guide ribs positioned therearound for annularly guiding the said closure member during its reciprocal movement in opening and closing the said valve.

8. A disk holder for a valve of the character described comprising, in combination, a valve stem having an enlarged end, a disk therefor, an opening in the side of the said disk holder communicating with an opening in the top of said disk holder for positioning the said disk therein and also for inserting the enlarged end of the said stem whereby the enlarged end of the stem retains the said disk in position within the said holder.

9. A disk holder for a valve of the character described comprising, in combination, a valve stem having a pair of spaced-apart enlarged heads adjacent the end thereof, the said disk holder having an apertured top and cylindrical side portion, the lower edge of the said cylindrical portion being formed inwardly, a plate-like disk fitted within the said disk holder, the lower of said stem heads being positioned within the disk holder and interposed between the said disk and the top of the said disk holder to maintain the said disk against substantial longitudinal movement within the said disk holder, the top of said disk holder being normally interposed between said spaced-apart enlarged stem heads and removable therefrom only by transverse movement of said disk holder with relation to said stem.

10. A disk holder for a valve, the combination comprising a stem having spaced annular flanges, the said disk holder having an apertured top plate and an apertured depending sleeve therearound with its lower edge formed inwardly, a disk insertable through one of the sleeve apertures and positioned upon the inwardly formed lower edge of the said sleeve, the annular flanges on said stem being adapted to removably engage the edges of an aperture formed in the top of said disk holder and extending from the center to the periphery thereof, and the lower of said annular stem flanges being adapted to hold the said insertable disk in a stationary position in the said disk holder, the said disk being removable from the said disk holder when the said disk holder is removed from the said stem.

11. In a disk holder for a valve of the character described, the combination comprising a stem having at its end portion spaced annular flanges, the said disk holder having an apertured top plate portion and an apertured depending sleeve therearound with its lower edge shouldered inwardly, the apertured plate of said disk holder having an aperture extending from the center to the periphery thereof, a disk insertable through one of the sleeve apertures and normally positioned upon the shouldered lower edge of the said sleeve, the said disk holder adapted to be removably positioned on the said stem between the annular flanges, and the lower of annular stem flanges being adapted to hold the said disk in a stationary position in the said disk holder, whereby the disk and washer are removable from the disk holder only when the said latter member is removed from the said stem, the said disk holder having means to restrain its movement to a substantially reciprocal path while positioned inside of said valve.

CARL R. STONE.